United States Patent
Li et al.

(10) Patent No.: US 11,543,897 B2
(45) Date of Patent: Jan. 3, 2023

(54) DISPLAY TERMINAL AND DISPLAY CONTROL METHOD

(71) Applicant: Yungu (Gu'an) Technology Co., Ltd., Langfang (CN)

(72) Inventors: Xuebin Li, Langfang (CN); Liwei Ding, Langfang (CN); Fu Liao, Langfang (CN); Xu Yang, Langfang (CN); Zhaoji Zhu, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 184 days.

(21) Appl. No.: 16/990,550

(22) Filed: Aug. 11, 2020

(65) Prior Publication Data
US 2020/0371604 A1   Nov. 26, 2020

Related U.S. Application Data

(63) Continuation of application No. PCT/CN2019/088553, filed on May 27, 2019.

(30) Foreign Application Priority Data

Nov. 13, 2018  (CN) .......................... 201811348526.3

(51) Int. Cl.
*G06F 3/03*  (2006.01)
*G06F 3/0482*  (2013.01)
(Continued)

(52) U.S. Cl.
CPC .............. *G06F 3/03* (2013.01); *G06F 1/1652* (2013.01); *G06F 1/1681* (2013.01); *G06F 3/045* (2013.01);
(Continued)

(58) Field of Classification Search
CPC .... G06F 1/1652; G06F 1/1643; G06F 1/1694; G06F 2203/04102; G06F 2203/04105;
(Continued)

(56) References Cited

U.S. PATENT DOCUMENTS 10,001,809 B2 *  6/2018  Seo .................. G09F 27/005
10,503,276 B2 * 12/2019  Kim ................. G09G 5/006
(Continued)

FOREIGN PATENT DOCUMENTS

CN       103246472 A      8/2013
CN       103389822 A      11/2013
(Continued)

OTHER PUBLICATIONS

PCT International Search Report of PCT/CN2019/088553 dated Sep. 2, 2019.
(Continued)

*Primary Examiner* — Dismery Mercedes
(74) *Attorney, Agent, or Firm* — Ladas & Parry LLP (57) ABSTRACT

Embodiments of the present application provide a display terminal and a display control method. When a flexible display screen of the display terminal is bent under a bending force, resistance values of a plurality of sensors in a flexible display panel are also changed under the bending force. An arithmetic unit converts bending information into control information for controlling a display object in the flexible display panel, and a controller controls a dynamic display of the flexible display panel by the control information.

17 Claims, 4 Drawing Sheets

(51) Int. Cl.
  *G06F 1/16*     (2006.01)
  *G06F 3/041*    (2006.01)
  *G06F 3/0484*   (2022.01)
  *G09F 9/30*     (2006.01)
  *G06F 3/045*    (2006.01)
  *G06F 3/0481*   (2022.01)

(52) U.S. Cl.
  CPC .......... *G06F 3/0412* (2013.01); *G06F 3/0414* (2013.01); *G06F 3/0481* (2013.01); *G06F 3/0482* (2013.01); *G06F 3/0484* (2013.01); *G09F 9/301* (2013.01); *G06F 2200/1637* (2013.01); *G06F 2203/04102* (2013.01)

(58) Field of Classification Search
  CPC .......... G06F 3/03; G06F 3/0412; G06F 3/045; G06F 3/0443; G06F 3/0414; G06F 3/035; G06F 3/04845; G06F 3/0487; G06F 3/017; G06F 3/0482; G06F 3/0484; G06F 3/0481; G06F 3/04886; G09G 2380/02
  See application file for complete search history.

(56) References Cited

U.S. PATENT DOCUMENTS

| | | | |
|---|---|---|---|
| 2012/0092363 A1 | 4/2012 | Kim et al. | |
| 2013/0120239 A1* | 5/2013 | Suzuki | G06F 1/1643 345/156 |
| 2014/0029017 A1* | 1/2014 | Lee | G01B 11/24 356/601 |
| 2014/0055345 A1* | 2/2014 | Seo | G06F 1/1652 345/156 |
| 2014/0055429 A1 | 2/2014 | Kwon et al. | |
| 2014/0078046 A1* | 3/2014 | Seo | G06F 1/1652 345/156 |
| 2014/0078047 A1* | 3/2014 | Seo | G06F 3/0487 345/156 |
| 2014/0101560 A1* | 4/2014 | Kwak | G06F 3/0488 715/788 |
| 2015/0022445 A1 | 1/2015 | Moriwaki | |
| 2015/0227173 A1* | 8/2015 | Hwang | G06T 11/60 345/619 |
| 2017/0060189 A1* | 3/2017 | Sohn | G06F 3/017 |
| 2017/0123558 A1* | 5/2017 | Hong | G06F 1/1641 |
| 2017/0150574 A1 | 5/2017 | Ka et al. | |
| 2017/0153750 A1* | 6/2017 | Jung | G06F 3/0446 |
| 2018/0275763 A1* | 9/2018 | Kim | G06F 3/04845 |

FOREIGN PATENT DOCUMENTS

| | | |
|---|---|---|
| CN | 104471513 A | 3/2015 |
| CN | 104700762 A | 6/2015 |
| CN | 106371672 A | 2/2017 |
| CN | 106971670 A | 7/2017 |
| CN | 107228383 A | 10/2017 |
| CN | 107657894 A | 2/2018 |
| CN | 207263110 U | 4/2018 |
| CN | 107980156 A | 5/2018 |
| CN | 108089798 A | 5/2018 |
| CN | 108319329 A | 7/2018 |
| CN | 108345426 A | 7/2018 |
| CN | 108571925 | 9/2018 |
| CN | 109491506 A | 3/2019 |
| EP | 2685373 A2 | 1/2014 |
| JP | 2013-254486 | 12/2013 |
| JP | 2014-81914 | 5/2014 |
| JP | 2015-518579 | 7/2015 |
| KR | 10-2013-0043526 A | 4/2013 |
| KR | 10-2013-0113901 A | 10/2013 |
| TW | 201346686 A | 11/2013 |
| TW | I576749 B | 4/2017 |

OTHER PUBLICATIONS

PCT Written Opinion of PCT/CN2019/088554 dated Sep. 2, 2019.
Chinese First Office Action for CN Application No. 201811348526.3 dated Dec. 2, 2019.
Taiwan First Office Action for Application No. 108121044 dated Jan. 15, 2020.
Japan Notice of Reasons for Refusal issued in corresponding Japanese patent application No. 2020-564087 dated Oct. 19, 2021.
European Search Report far application No. 19885428.3 dated Jul. 1, 2021.
Korean first office action for application No. 10-2020-7032445 dated Oct. 26, 2022.

* cited by examiner

DISPLAY TERMINAL AND DISPLAY CONTROL METHOD

CROSS-REFERENCE TO RELATED APPLICATION

This application is a continuation application of International Application No. PCT/CN2019/088553 filed on May 27, 2019, which claims priority to Chinese patent application No. 201811348526.3 fled on Nov. 13, 2018. Both applications are incorporated herein by reference in their entireties.

TECHNICAL FIELD

The present application relates to the field of human-computer interaction technologies, in particularly to a display terminal and a display control method.

BACKGROUND

Intelligent terminals are more and more popular in social life. Terminal display interfaces, serving as a main entrance for users to interact with the intelligent terminals, have an important impact on human-computer interaction experience of the users.

SUMMARY

Embodiments of the present application provide a display terminal and a display control method, which utilize bendable and flexible characteristics of a flexible display screen to realize human-computer interaction by using bending information (such as bending creases) of the flexible display screen.

In order to utilize the bendable and flexible characteristics of the flexible display screen, bending information (such as bending crease) of the flexible display screen is used to realize the human-computer interaction. A bending shape parameter of the flexible display screen may be sensed, a corresponding relationship between the bending shape parameter and a dynamic adjustment parameter of a frame to be adjusted on the terminal may be established, and then a dynamic display on the frame to be adjusted is controlled according to the dynamic parameter of the frame to be adjusted. However, this method only gives an achievable result, but it does not record how to achieve, such as how to use a bending direction of the flexible display screen to determine the dynamic display on a display page.

In view of the above technical problems, the basic concept of the present disclosure is to propose a display terminal and a display control method.

According to one aspect of the present disclosure, some embodiments of the present disclosure provide a display terminal, including: a flexible display panel; a sensor layer including a plurality of sensors which are flexible and distributed in an array, the sensor layer being used for converting a bending force exerted by the flexible display panel into changes in resistance value; an arithmetic unit for converting the changes in resistance value of the sensors into control signals; and a controller for receiving the control signals of the arithmetic unit and controlling a dynamic display in the flexible display panel by the control signals.

According to another aspect of the present disclosure, some embodiments of the present disclosure also provide a display control method, including: providing a flexible display panel with a plurality of sensors distributed in an array; acquiring resistance change values of the sensors in the flexible display panel in a bent state; acquiring a crease position of the flexible display panel according to the resistance change values of the sensors; and acquiring control information of a display object of the flexible display panel according to the resistance change values of the sensors located at the crease position and on both sides of the crease position.

In the display terminal according to the embodiments of the present disclosure, as the bendable and flexible characteristics of the flexible display screen, the bending force may be exerted to the flexible display screen at any position. When the flexible display screen is bent under the bending force, the changes in resistance value of the sensors in the flexible display panel may be performed under the bending force. The bending information of the flexible display screen is obtained according to the changes in resistance value, and the bending information is converted into the control information for controlling the display object in the flexible display panel, such as the motion information of the display object and the zoom information of the display object, and thereby the display of the display object in the flexible display panel is controlled. Thus, the specific process of the dynamic adjustment of the display information in the flexible display panel by using the bendable performance of the flexible display panel is given, which meets the user's diversified and personalized requirements for the display effect in the flexible display panel, and improves the experience of the human-computer interaction between the users and the flexible display panel.

DETAILED DESCRIPTION OF THE EMBODIMENTS

The technical schemes in the embodiments of the present application will be described clearly and completely below in combination with the accompanying drawings in the embodiments of the present invention.

Figure 1:
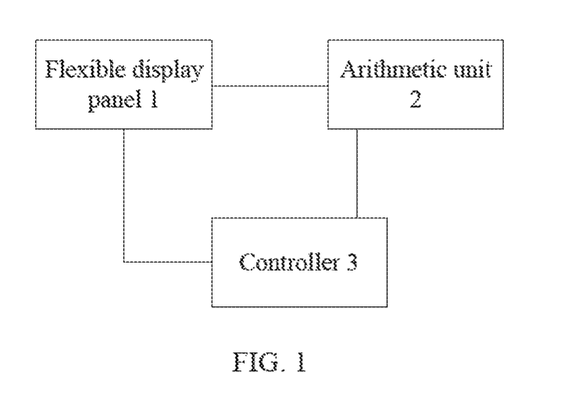
FIG. 1 and FIG. 2 are structural schematic diagrams of a display terminal according to an embodiment of the present disclosure.

The display terminal includes a flexible display panel 1, an arithmetic unit 2, and a controller 3. A sensor layer is provided in the flexible display panel 1, the sensor layer includes a plurality of flexible sensors, and the sensor layer converts a bending force exerted by the flexible display panel into changes in resistance value. The arithmetic unit 2 converts the changes in resistance value of the sensors into control signals. The controller 3 receives the control signals of the arithmetic unit 2 and controls a dynamic display in the flexible display panel by the control signals. Since the flexible display panel is bent under the bending force exerted outside, the sensors provided in the flexible display panel 1 are also bent under the bending force, thereby generating the changes in resistance value. When a resistance change value of one sensor in the flexible display panel is greater than zero, said sensor is deformed under the bending force. After the arithmetic unit 2 acquires the resistance change values of the sensors, because the sensors are distributed in an array in the flexible display panel and an area occupied by the sensors distributed in an array is greater than that of the flexible display panel on a display surface, the specific position subjected to the bending in the flexible display panel is acquired according to the resistance change values which are obtained by positions of sensors subjected to the bending force.

In this embodiment of the present disclosure, as the bendable and flexible characteristics of the flexible display screen, the bending force may be exerted to the flexible display screen at any position. When the flexible display screen is bent under the bending force, the changes in resistance value of the sensors in the flexible display panel may be performed under the bending force. The bending information of the flexible display screen is obtained according to the changes in resistance value, and the bending information is converted into the control information for controlling the display object in the flexible display panel, such as the motion information of the display object and the zoom information of the display object, and thereby the display of the display object in the flexible display panel is controlled. Thus, the specific process of the dynamic adjustment of the display information in the flexible display panel by using the bendable performance of the flexible display panel is given, which meets the user's diversified and personalized requirements for the display effect in the flexible display panel, and improves the experience of the human-computer interaction between the users and the flexible display panel.

In an embodiment of the present disclosure, in order to better use the bending of the flexible display screen to acquire the control information of the display object by the sensors, two sensor layers are provided in the flexible display screen defined as a first sensor layer and a second sensor layer. A plurality of first sensors are distributed in an array in the first sensor layer and a plurality of second sensors are distributed in an array in the second sensor layer. The sensors in the first sensor layer and the second sensor layer are distributed in the same way, and a direction of the array includes a first direction and a second direction perpendicular to each other. I.e., two sensors are superimposed under one position in the flexible display screen and the two sensors are defined as a first sensor and a second sensor. The first sensor is configured to sense the resistance change value generated in the first direction under the bending force. The second sensor is configured to sense the resistance change value generated in the second direction.

It should be understood that the sensors in the flexible display panel may be distributed in an array as described above, but the embodiments of the present disclosure are not limited to this. For example, it may also be selected to provide only one sensor layer with the sensors distributed in an array, and sensors for sensing the resistance change value generated in the first direction and sensors for sensing the resistance change value generated in the second direction are spaced apart. Therefore, as long as the sensors in the flexible display panel may sense the resistance change values from different directions, the distribution of the sensors in the flexible display panel is not limited in the embodiments of the present application.

Figure 2:
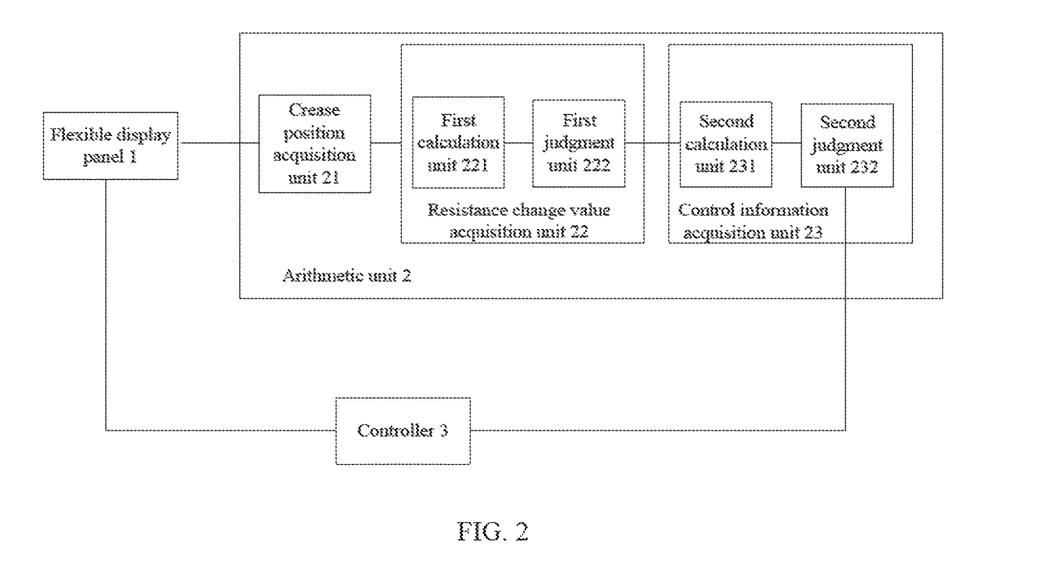

In an embodiment of the present disclosure, as shown in FIG. 2, the arithmetic unit 2 includes a resistance change value acquisition unit 22 configured to acquire resistance change values of the sensors distributed in the array in the flexible display panel 1 in a bent state; a crease position acquisition unit 21 configured to acquire a crease position of the flexible display panel 1 according to the resistance change values of the sensors; and a control information acquisition unit 23 configured to acquire control information of a display object of the flexible display panel according to the resistance change values of the sensors located at the crease position and on both sides of the crease position.

Among them, the control information of the display object of the flexible display panel includes motion information of the display object, and the motion information of the display object includes a moving direction. For example, when a display page in the flexible display panel is a real scene image of a moving field, and the display object in a frame includes a dynamic display object, the moving direction refers to a dynamic display effect generated by the dynamic object. In order to maintain the display effect to bring good vision to the users, in this embodiment, only the display object that can generate the dynamic effect in the display page is controlled to present the dynamic performance, while other display objects remain relatively still.

In an embodiment of the present disclosure, a projection of the moving direction in the first direction is defined as a first reference direction, a projection of the moving direction in the second direction is defined as a second reference direction, and an angle between the moving direction and the first reference direction is defined as a first angle.

Because the crease position is where the bending force exerted by the flexible display panel, when the crease position of the flexible display panel is acquired, a direction of the bending force is perpendicular to the crease position by analyzing the resistance change values of the sensors located at the crease position. The determination of a final direction of the bending force needs to be acquired according to the resistance change values of the sensors located on both sides of the crease position.

It should be understood that the control information of the display object in the flexible display panel may also include a moving distance of the display object in addition to the moving direction. A specific acquisition method may be acquired according to a judge of a bending rate of the flexible display panel during bending according to the crease position, and a judge of the moving distance of the display object according to the bending rate.

It should be understood that the control information of the display object in the embodiment of the present disclosure is mainly the moving direction that enables the display object to generate the dynamic effect, but the embodiments of the present disclosure are not limited thereto. The control information may also be other control information of the display object, such as size scaling of the display object, brightness adjustment of the display object, etc.

In an embodiment of the present disclosure, the resistance change value acquisition unit 22 is configured to: acquire first resistance change values of the sensors in the first direction (i.e., the first resistance change values $\Delta R1$ of the sensors located directly below a certain position in the flexible display panel in the first direction); and acquire second resistance change values of the sensors in the second direction (i.e., the second resistance change values $\Delta R2$ of the sensors located directly below a certain position in the flexible display panel in the second direction).

Figure 3:
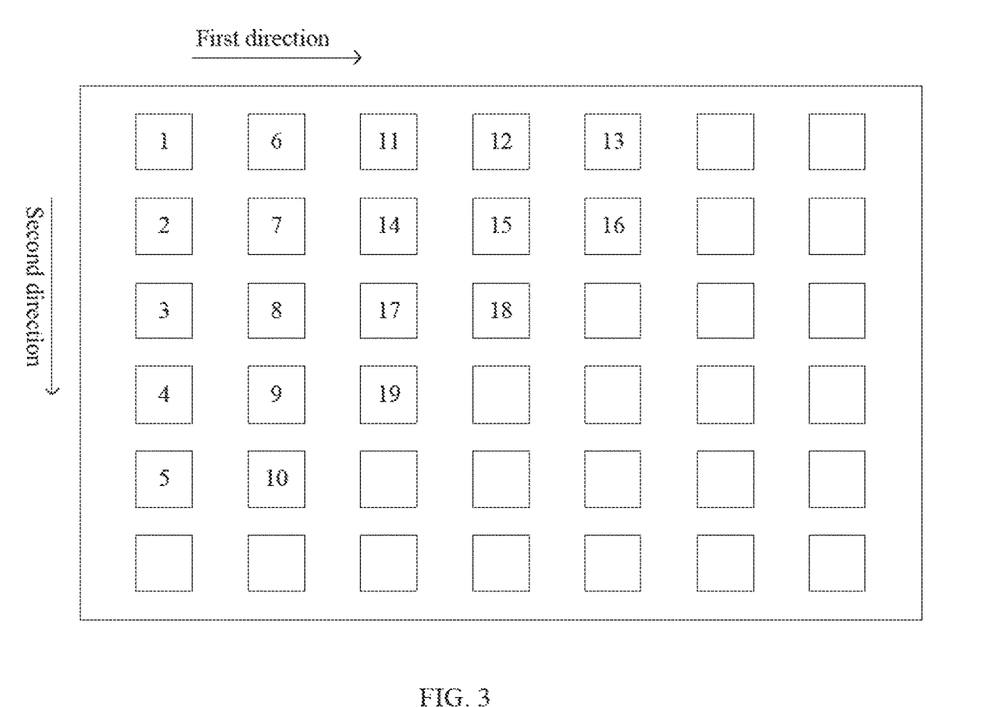
FIG. 3 and FIG. 4 are schematic diagrams of a moving direction of a display object in a display terminal according to an embodiment of the present disclosure.

Specifically, taking the bending force exerting on an upper left corner of the flexible display panel as an example, the sensor layer includes a first sensor layer and a second sensor layer, and a plurality of second sensors are distributed in an array in the second sensor layer. The sensors in the first sensor layer and the second sensor layer are distributed in the same way. A direction of the array includes the first direction and the second direction which are perpendicular to each other. The sensors with resistance change value greater than zero are marked after the resistance change values of the sensors are acquired. As shown in FIG. 3, when the upper left corner of the flexible display panel is in the bent state due to the bending force, the first sensors and/or the second sensors below positions 1-19 of the upper left corner of the flexible display panel have the changes in resistance value, and the first resistance change value $\Delta R1$ of each first sensor and the second resistance change value $\Delta R2$ of each second sensor at the positions 1-19 are respectively required. In this embodiment, by specifically limiting a manner of an array distribution of the sensors in the flexible display panel, and correlating an arrangement direction of the sensors in the array distribution with the moving direction of the display object in the control information, when it is necessary to acquire the resistance change values of the sensors in the bent state, it is only necessary to acquire the resistance change value of each sensor in its own arrangement direction, and thus the process of the entire control method is simplified.

In an embodiment of the present disclosure, the resistance change value acquisition unit 22 includes a first calculation unit 221 and a first judgment unit 222. As shown in FIG. 2, the first calculation unit 221 is configured to: calculate first imitation force values of the sensors according to the first resistance change values of the sensors, the first imitation force values being equal to the first resistance change values multiplied by first conversion coefficients of the sensors; sum the first imitation force values to obtain a sum of the first imitation force values; calculate second imitation force values of the sensors according to the second resistance change values of the sensors, the second imitation force values being equal to the second resistance change values multiplied by second conversion coefficients of the sensors; and sum the second imitation force values to obtain a sum of the second imitation force values.

The first judgment unit 222 is configured to: acquire a main direction of the bending force on the flexible display panel according to the first imitation force values and the second imitation force values of the sensors; acquire the crease position according to the main direction of the bending force, the first imitation force values and the second imitation force values of the sensors. The first judgment unit 222 is specifically configured to: acquire the sum of the first imitation force values and the sum of the second imitation force values calculated by the first calculation unit; judge that the main direction of the bending force is in the first direction, when the sum of the first imitation force values is greater than the sum of the second imitation force values; judge that the main direction of the bending force is in the second direction, when the sum of the first imitation force values is less than the sum of the second imitation force values; and determine one sensor with a largest second imitation force value in each column of the array in the second direction as a positioning sensor so as to acquire a plurality of positioning sensors, and determine positions on which the positioning sensors are located as the crease position, when the main direction of the bending force is in the first direction.

Figure 4:
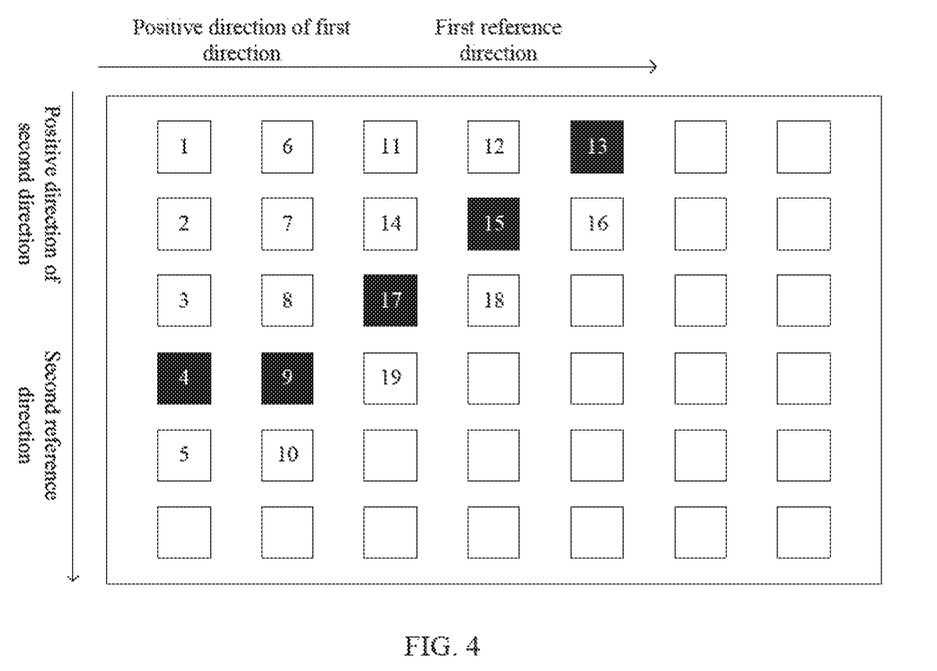

Specifically, taking the bending force exerting on the upper left corner of the flexible display panel described above as an example, the first calculation unit 221 is configured to: sum the first imitation force values F1 of the first sensors (i.e., the imitation force value F1 of each first sensor for sensing the resistance change value in the first direction at the positions 1-19) to obtain $\Sigma F1$; and sum the second imitation force values F2 of the second sensors (i.e., the imitation force value F1 of each second sensor for sensing the resistance change value in the second direction at the positions 1-19 in FIG. 3) to obtain $\Sigma F2$. The first judgment unit 222 is configured to compare magnitudes of the $\Sigma F1$ and the $\Sigma F2$, and if the magnitude of the $\Sigma F1$ is greater than the magnitude of the $\Sigma F2$, the main direction of the bending force experienced by the flexible display panel is in the first direction. As shown in FIG. 4, the resistance change values of the sensors, used for sensing the resistance change values generated in the second direction at the positions 1, 2, 3, 4, 5; 6, 7, 8, 9, 10; 11, 14, 17, 19; 12, 15, 18; and the positions 13, 16 which are in one column of the array in a same second direction, are separately acquired, and the sensor with the largest resistance change value in each column of the array in a same second direction is separately found out so as to acquire a plurality of sensors with the largest second imitation force value, i.e., the sensors at the positions 4, 9, 17, 15, and 13. The positions where the second sensors and the first sensors are located at 4, 9, 17, 15, and 13 are defined as the crease position.

In an embodiment of the present disclosure, the control information acquisition unit 23 is configured to: acquire crease position information sent by the first judgment unit 222; acquire the first reference direction and the second reference direction according to the first resistance change values and the second resistance change values of the sensors located on both sides of the crease position; and calculate the first angle according to the first resistance change values and the second resistance change values of the sensors located at the crease position.

Specifically, as shown in FIG. 2, the control information acquisition unit 23 includes a second calculation unit 231 and a second judgment unit 232. The second calculation unit 231 is configured to: calculate a sum of the first imitation force values of the sensors located at one side of the crease position relative to a negative direction of the first direction to obtain a first value; calculate a sum of the first imitation force values of the sensors located at one side of the crease position relative to a positive direction of the first direction to obtain a third value; calculate a sum of the second imitation force values of the sensors located at one side of the crease position relative to a negative direction of the second direction to obtain a second value; and calculate a sum of the second imitation force values of the sensors located at one side of the crease position relative to a positive direction of the second direction to obtain a fourth value. The first imitation force values are equal to the first resistance change values multiplied by the first conversion coefficients of the sensors; and the second imitation force values are equal to the second resistance change values multiplied by the second conversion coefficients of the sensors. The second judgment unit 232 is configured to: acquire the first reference direction according to the first value and the third value, and acquire the second reference direction according to the second value and the fourth value; determine that the first reference direction is the positive direction of the first direction, when the first value is less than the third value, and determine that the first reference direction is the negative direction of the first direction, when the first value is more than the third value; and determine that the second reference direction is the negative direction of the second direction, when the second value is greater than the fourth value, and determine that the second reference direction is the positive direction of the second direction, when the second value is less than the fourth value.

Figure 5:
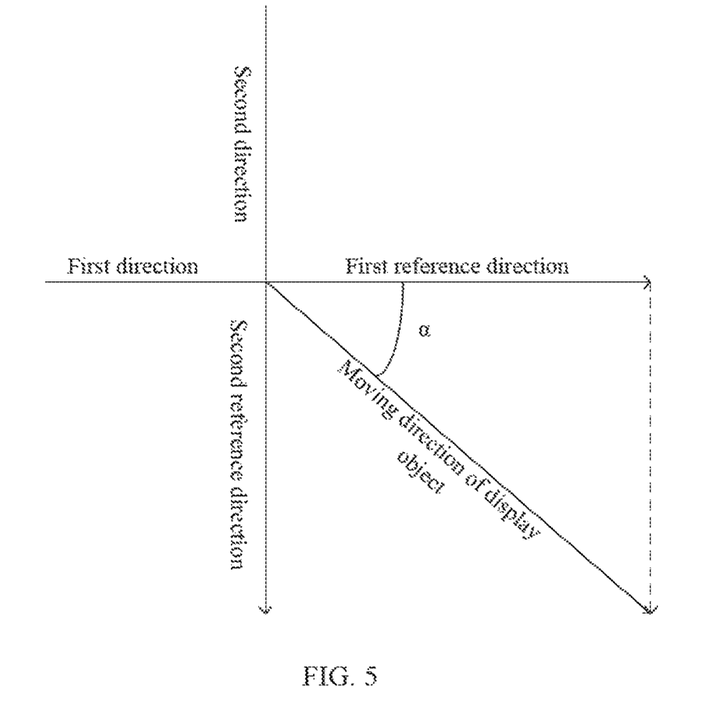
FIG. 5 is a diagram showing a relationship between a moving angle in control information of a display object and a direction of an array of a plurality of sensors distributed in an array in a display control method according to an embodiment of the present disclosure.

Specifically, taking the bending force exerting on the upper left corner of the flexible display panel described above as an example, the second calculation unit 231 is further configured to calculate and sum the first imitation force values F1 of the first sensors at one side of the crease position relative to the negative direction of the first direction (i.e., the first imitation force values of the first sensors at nine positions of 1, 2, 3, 6, 7, 8, 11, 14, 12 is summed to obtain the first value ΣF11); calculate and sum the first imitation force values F1 of the first sensors at one side of the crease position relative to the positive direction of the first direction (i.e., the sum of the first imitation force values of the first sensors at five positions of 5, 10, 19, 18, 16 are summed to obtain the second value ΣF2); calculate and sum the second imitation force values F2 of the second sensors at one side of the crease position relative to the negative direction of the second direction (i.e., the second imitation force values of the second sensors at nine positions of 1, 2, 3, 6, 7, 8, 11, 14, 12 are summed to obtain the first value ΣF21); and calculate and sum the second imitation force values F22 of the second sensors at one side of the crease position relative to the positive direction of the second direction (i.e., the second imitation force values of the second sensors at five positions of 5, 10, 19, 18, 16 are summed to obtain the second value ΣF22). The second judgment unit 232 is further configured to judge magnitudes of the ΣF11 and the ΣF12 and magnitudes of the ΣF21 and the ΣF22. As shown in FIG. 4 and FIG. 5, if the magnitude of the ΣF11 is less than the magnitude of the ΣF12, the first reference direction is the positive direction of the first direction, i.e., the projection of the moving direction of the display object in the first direction is defined as the first reference direction, and if the magnitude of the ΣF21 is less than the magnitude of the ΣF22, the second reference direction is the positive direction of the second direction, i.e., the projection of the moving direction of the display object in the second direction is defined as the second reference direction.

In an embodiment of the present disclosure, the second calculation unit 231 is further configured to calculate a ratio of the sum of the first imitation force values and the sum of the second imitation force values according to the sum of the first imitation force values and the sum of the second imitation force values of the sensors located at the crease position. The second judgment unit 232 is further configured to calculate a tangent or a cotangent of the first angle according to the ratio of the sum of the first imitation force values and the sum of the second imitation force values. The first imitation force values are equal to the first resistance change values multiplied by the first conversion coefficients of the sensors, and the second imitation force values are equal to the second resistance change values multiplied by the second conversion coefficients of the sensors.

Specifically, taking the bending force exerting on the upper left corner of the flexible display panel described above as an example, the second calculation unit 231 is further configured to calculate and sum the first imitation force values F111 of the first sensors in the first sensor layer at the crease position (i.e., the first imitation force values of the first sensors at five positions of 4, 9, 17, 15, 13 are summed to obtain the ΣF111); and calculate and sum the second imitation force values F211 of the second sensors in the second sensor layer at the crease position (i.e., the second imitation force values of the second sensors at the five positions of 4, 9, 17, 15, 13 are summed to obtain the ΣF211). As shown in FIG. 4 and FIG. 5, the second judgment unit 232 is further configured to calculate the ratio of the ΣF111 and the ΣF211. When the first reference direction is the positive direction of the first direction, the tangent of the first angle is equal to the ratio of the ΣF111 to the ΣF211. As shown in FIG. 5, when the first reference direction is the negative direction of the second direction, the cotangent of the first angle is equal to the ratio of the ΣF111 to the ΣF211.

The display terminal in the embodiments may be used in any scene of the human-computer interaction. For example, when a golf hole entering game is displayed in the flexible display panel, i.e., the user is playing a golf game, and the golf ball may be moved from a position to enter the hole by bending the flexible display panel. When the user bends the flexible display panel in the upper left corner of the flexible display panel, the golf ball at a certain position on the display page moves to a lower right corner. By repeatedly bending different positions of the flexible display panel, the moving direction of the golf ball is controlled until the golf ball enters the hole.

Figure 6:
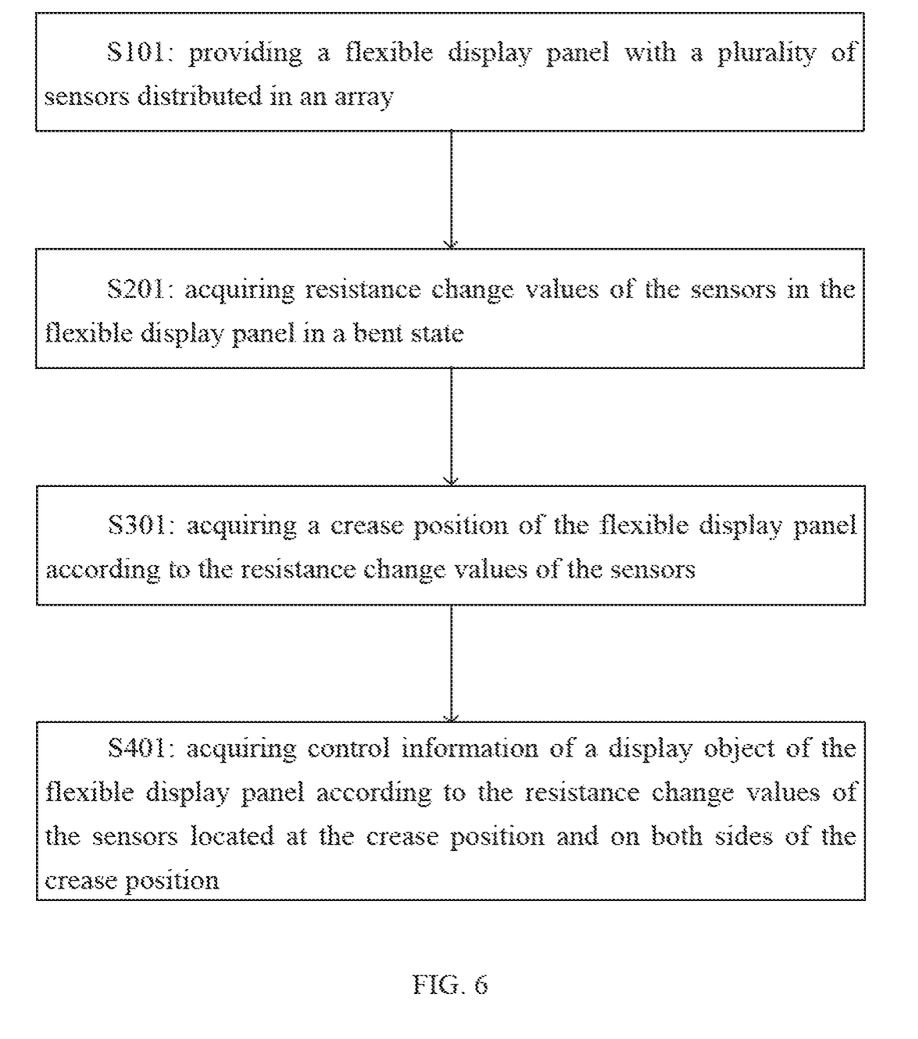
FIG. 6 is a flow schematic diagram of a display control method according to an embodiment of the present disclosure.

FIG. 6 is a flow schematic diagram of a display control method according to an embodiment of the present disclosure. As shown in FIG. 6, the display control method includes the following steps.

S101: providing a flexible display panel with a plurality of sensors distributed in an array.

S201: acquiring resistance change values of the sensors in the flexible display panel in a bent state.

In the step S201, since the flexible display panel is bent under the bending force exerted outside, the sensors provided in the flexible display panel are also bent under the bending force, thereby generating changes in resistance value. When a resistance change value of one sensor in the flexible display panel is greater than zero, said sensor is deformed under the bending force.

In an embodiment of the present disclosure, in order to better use the bending of the flexible display screen to acquire the control information of the display object by the sensors, two sensor layers are provided in the flexible display screen defined as a first sensor layer and a second sensor layer. A plurality of first sensors are distributed in an array in the first sensor layer and a plurality of second sensors are distributed in an array in the second sensor layer. The sensors in the first sensor layer and the second sensor layer are distributed in the same way, and a direction of the array includes a first direction and a second direction perpendicular to each other. I.e., two sensors are superimposed under one position in the flexible display screen defined as a first sensor and a second sensor. The first sensor is configured to sense the resistance change value generated in the first direction under the bending force. The second sensor is configured to sense the resistance change value generated in the second direction.

It should be understood that the sensors in the flexible display panel may be distributed in an array described above, but the embodiments of the present disclosure are not limited to this. For example, it may also be selected to provide only one sensor layer with the sensors distributed in an array, and sensors for sensing the resistance change value generated in the first direction and sensors for sensing the resistance change value generated in the second direction are spaced apart. Therefore, as long as the sensors in the flexible display panel may sense the resistance change values from different directions, the distribution of the sensors in the flexible display panel is not limited in the embodiments of the present disclosure.

S301: acquiring a crease position of the flexible display panel according to the resistance change values of the sensors.

In this step, the crease position of the flexible display panel is acquired according to the characteristics of resistance change of the sensor in the flexible display panel due to the bending force. The crease position refers to a curve or a straight line formed on the flexible display panel after the flexible display panel is bent under the bending force.

In the step S301, since the flexible display panel is bent under the bending force exerted outside, the sensors provided in the flexible display panel are also bent under the bending force, thereby generating the changes in resistance value. When a resistance change value of one sensor in the flexible display panel is greater than zero, said sensor is deformed under the bending force; and when a resistance value change of one sensor in the flexible display panel is equal to zero, said sensor is not subjected to the bending force. Therefore, the sensors subjected to the bending force may be acquired according to the changes in resistance value of the sensors, thereby obtaining positions of the sensors subjected to the bending force. Because the sensors are distributed in an array in the flexible display panel and an area occupied by the sensors distributed in an array is greater than that of the flexible display panel on a display surface, the specific position in the flexible display panel subjected to the bending may be acquired by acquiring the positions of the sensors subjected to the bending force.

When the flexible display panel is subjected to the bending force, not all sensors may be deformed, i.e., not all the sensors' resistance change values are greater than zero. Therefore, at this step, no matter whether the sensors have the changes in resistance value, the sensors without the changes in resistance value are taken into account, which undoubtedly increases calculation pressure. Therefore, in an embodiment, after the resistance change values in the sensors are acquired in the step S201, the sensors with resistance change value greater than zero are acquired first, and then the sensors with resistance change value greater than zero are marked. When the crease position of the flexible display panel is subsequently obtained according to the resistance change values, only the sensors with resistance change value greater than zero are considered, and the sensors with resistance change value equal to zero are not considered, and thus the calculation process is simplified and the calculation pressure is reduced.

S401: acquiring control information of a display object of the flexible display panel according to the resistance change values of the sensors located at the crease position and on both sides of the crease position.

In the step S401, the control information of the display object of the flexible display panel includes motion information of the display object, and the motion information of the display object includes a moving direction. For example, when a display page in the flexible display panel is a real scene image of a moving field, and the display object in a fame includes a dynamic display object, so the moving direction refers to a dynamic display effect generated by the dynamic object. In order to maintain the display effect to bring good vision to the user, in this embodiment, only the display object that can generate the dynamic effect in the display page is controlled to present the dynamic performance, while other display objects remain relatively still.

In an embodiment of the present disclosure, a projection of the moving direction in the first direction is defined as a first reference direction, a projection of the moving direction in the second direction is defined as a second reference direction, and an angle between the moving direction and the first reference direction is defined as a first angle.

Because the crease position is where the bending force exerted by the flexible display panel, when the crease position of the flexible display panel is acquired, a direction of the bending force is perpendicular to the crease position by analyzing the resistance change values of the sensors located at the crease position. The determination of a final direction of the bending force needs to be acquired according to the resistance change values of the sensors located on both sides of the crease position.

It should be understood that the control information of the display object in the flexible display panel may also include a moving distance of the display object in addition to the moving direction. A specific acquisition method may be acquired according to a judge of a bending rate of the flexible display panel during bending according to the crease position, and a judge of the moving distance of the display object according to the bending rate.

It should be understood that the control information of the display object in the embodiment is mainly the moving direction that enables the display object to generate the dynamic effect, but the embodiments of the present disclosure are not limited thereto. The control information may also be other control information of the display object, such as size scaling of the display object, brightness adjustment of the display object, etc.

In the display control method according to the embodiments, as the bendable and flexible characteristics of the flexible display screen, the bending force may be exerted to the flexible display screen at any position. When the flexible display screen is bent under the bending force, the changes in resistance value of the sensors in the flexible display panel may be performed under the bending force. The bending information of the flexible display screen is obtained according to the changes in resistance value, and the bending information is converted into the control information for controlling the display object in the flexible display panel, such as the motion information of the display object and the zoom information of the display object, and thereby the display of the display object in the flexible display panel is controlled. Thus, the specific process of the dynamic adjustment of the display information in the flexible display panel by using the bendable performance of the flexible display panel is given, which meets the users diversified and personalized requirements for the display effect in the flexible display panel, and improves the experience of the human-computer interaction between the users and the flexible display panel.

In an embodiment of the present disclosure, in order to better use the bending of the flexible display screen to acquire the control information of the display object by the sensors, two sensor layers are provided in the flexible display screen and the two sensor layers have a first sensor layer and a second sensor layer. A plurality of first sensors are distributed in an array in the first sensor layer and a plurality of second sensors are distributed in an array in the second sensor layer. The sensors in the first sensor layer and the second sensor layer are distributed in the same way, and a direction of the array includes a first direction and a second direction perpendicular to each other. I.e., two sensors are superimposed under one position in the flexible display screen and the two sensors have a first sensor and a second sensor. The first sensor is configured to sense the resistance change value generated in the first direction under the bending force. The second sensor is configured to sense the resistance change value generated in the second direction. When the flexible display panel is in a bent state due to the bending force, in the step S201, the acquiring resistance change values of the sensors distributed in an array in the flexible display panel in a bent state specifically includes the following steps.

S2011: acquiring first resistance change values of the sensors distributed in an array in the first direction.

In the step S2011, the resistance change values $\Delta R1$ of the first sensors are acquired, i.e., the resistance change values $\Delta R1$ are the first resistance change values of the sensors located directly below a certain position in the flexible display panel in the first direction.

S2012: acquiring second resistance change values of the sensors distributed in an array in the second direction.

In the step S2012, the resistance change values $\Delta R2$ of the second sensors are acquired, i.e., the resistance change values $\Delta R2$ are the second resistance change values of the sensors located directly below a certain position in the flexible display panel in the second direction.

The sensors with resistance change value greater than zero are marked after the resistance change values of the sensors are acquired. As shown in FIG. 3, when an upper left corner of the flexible display panel is in the bent state due to the bending force, the first sensors and/or the second sensors below positions 1-19 of the upper left corner of the flexible display panel have the changes in resistance value, and the first resistance change value $\Delta R1$ of each first sensor and the second resistance change value $\Delta R2$ of each second sensor at the positions 1-19 are respectively required. In this embodiment, by specifically limiting a manner of an array distribution of the sensors in the flexible display panel, and correlating an arrangement direction of the sensors in the array distribution with the moving direction of the display object in the control information, when it is necessary to acquire the resistance change values of the sensors in the bent state, it is only necessary to acquire the resistance change value of each sensor in its own arrangement direction, and thus the process of the entire control method is simplified.

After the resistance change values of the sensors in the first direction and the second direction are acquired, the crease position of the flexible display screen needs to be acquired according to the resistance change values. In an embodiment, the step S301 includes the following steps.

S3011: calculating first imitation force values F1 of the sensors according to the first resistance change values of the sensors. The first imitation force values F1 are equal to the first resistance change values $\Delta R1$ multiplied by first conversion coefficients of the sensors. The first conversion coefficient is related to the material used by the sensor and the bent state of the sensor when the flexible display screen is bent, i.e., in the case that all sensors used in the flexible display screen are the same, when the bending force experienced by one sensor is relatively large, the bending degree of a position on which said sensor is located is relatively large, and the conversion coefficient of said sensor is high.

Since the crease position in the flexible display panel is generated under the bending force experienced by the flexible display panel, and the sensors at the crease position are deformed due to the bending force, the sensors may generate the changes in resistance value. Therefore, according to a reverse derivation, magnitude of the bending force experienced by the sensors may be derived according to the changes in resistance value, and then the position of the flexible display panel subjected to the bending force may be derived, i.e., the crease position of the flexible display panel.

Specifically, as shown in FIG. 3, the imitation force values F1 are calculated according to the resistance change values $\Delta R1$ of the first sensors directly below the positions 1-19.

S3012: calculating second imitation force values of the sensors according to the second resistance change values of the sensors. The second imitation force values are equal to the second resistance change values multiplied by second conversion coefficients of the sensors. The second conversion coefficient is related to the material used by the sensor and the bent state of the sensor when the flexible display screen is bent, i.e., in the case that all sensors used in the flexible display screen are the same, when the bending force of one sensor is relatively large, the bending degree of a position on which said sensor is located is relatively large, and the conversion coefficient of said sensor is high.

Specifically, as shown in FIG. 3, the imitation force values F2 are calculated according to the resistance change values $\Delta R2$ of the second sensors directly below the positions 1-19.

S3013: acquiring a main direction of a bending force experienced by the flexible display panel according to the first imitation force values and the second imitation force values of the sensors.

In the step S3013, the main direction of the bending force experienced by the flexible display panel is mainly acquired according to a comparison of the sum of the first imitation force values and the sum of the second imitation force values of the sensors. In an embodiment of the present disclosure, the specific acquisition method of the step S3013 includes: summing the first imitation force values F1 of the first sensors (i.e., the imitation force value F1 of each first sensor for sensing the resistance change value in the first direction at positions 1-19 are summed) to obtain $\Sigma F1$; summing the second imitation force values F2 of the second sensors (i.e., the imitation force value F2 of each second sensor for sensing the resistance change value in the second direction at positions 1-19 in FIG. 2 are summed) to obtain $\Sigma F2$; and comparing magnitudes of the F1 and the $\Sigma F2$, and when the magnitude of the $\Sigma F1$ is greater than the magnitude of the $\Sigma F2$, judging that the main direction of the bending force experienced by the flexible display panel is in the first direction.

S3014: acquiring the crease position according to the main direction of the bending force, the first imitation force values and the second imitation force values of the sensors.

In the step S3014, the crease position is mainly acquired according to the main direction of the bending force experienced by the flexible display panel obtained in the step S3013 and the changes in resistance value of the sensors in a direction perpendicular to the main direction of the bending force experienced by the flexible display panel.

In an embodiment of the present disclosure, the step S3014 specifically includes: if the main direction of the bending force exerted by the flexible display panel obtained in the step S3013 is in the first direction, acquiring and comparing the second imitation force values F2 of the second sensors distributed in the second direction in the second sensor layer, and acquiring one second sensor with a largest second imitation force value F2 in each column of the array in the second direction so as to acquire a plurality of second sensors with the largest second imitation force value F2. The positions on which the second sensors are located are defined as the crease position. Specifically, as shown in FIG. 3, the resistance change values of the sensors, used for sensing the resistance change values generated in the second direction at the positions 1, 2, 3, 4, 5; 6, 7, 8, 9, 10; 11, 14, 17, 19; 12, 15, 18; and the positions 13, 16 which are in one column of the array in a same second direction, are separately acquired, and the sensor with the largest resistance change value in each column of the array in a same second direction is separately found out so as to acquire a plurality of sensors with the largest second imitation force value, i.e., the sensors at the positions 4, 9, 17, 15, and 13. The positions 4, 9, 17, 15, and 13 on which the second sensors and the first sensors are located are defined as the crease position.

In this embodiment, by multiplying the resistance change values of the sensors in the flexible display panel by the conversion coefficients of the sensors, when the flexible display panel is bent, a direction of the bending force is the moving direction of the display object, and thus the imitation force values of the sensors in the flexible display panel are acquired. Whether the main direction of the bending force among the bending forces experienced by the flexible display panel is in the first direction or the second direction is determined. When the main direction of the bending force experienced by the flexible display panel is in the first direction, the crease position is acquired according to the second imitation force values of the sensors.

In the step S3014, the crease position in the flexible display panel is acquired. Next, the first reference direction, the second reference direction, and the first angle need to be acquired according to the crease position. In an embodiment, the step S401 of acquiring control information of a display object of the flexible display panel according to the resistance change values of the sensors located at the crease position and on both sides of the crease position includes the following steps.

S4011: acquiring the first reference direction and the second reference direction according to the first resistance change values ΔR1 and the second resistance change values ΔR2 of the sensors located on both sides of the crease position.

In the step S4011, the control information of the display object is acquired according to the crease position of the flexible display panel. The control information includes motion information, and the motion information includes a moving direction. A projection of the moving direction in the first direction is defined as the first reference direction, a projection in the second direction is defined as the second reference direction, and the angle between the moving direction and the first reference direction is defined as the first angle. It can be seen from this that if the moving direction needs to be acquired, the first reference direction, the second reference direction, and the first angle need to be acquired first.

In the step S4011, the step of acquiring the first reference direction mainly includes:

calculating and summing the first imitation force values F1 of the first sensors at one side of the crease position relative to the negative direction of the first direction (i.e., the first imitation force values of the first sensors at nine positions of 1, 2, 3, 6, 7, 8, 11, 14, 12 are summed to obtain the first value ΣF1); calculating and summing the first imitation force values F1 of the first sensors at one side of the crease position relative to the positive direction of the first direction (i.e., the first imitation force values of the first sensors at five positions of 5, 10, 19, 18, 16 are summed to obtain the second value ΣF12); and if magnitude of the ΣF11 is less than magnitude of the ΣF12, determining that the first reference direction is the positive direction of the first direction (i.e., the projection of the moving direction of the display object in the first direction is defined as the first reference direction), as shown in FIG. 4 and FIG. 5.

In the step S4011, the step of acquiring the second reference direction mainly includes:

calculating and summing the second imitation force values F2 of the second sensors at one side of the crease position relative to the negative direction of the second direction (i.e., the second imitation force values of the first sensors at nine positions of 1, 2, 3, 6, 7, 8, 11, 14, 12 are summed to obtain the first value ΣF21); calculating and summing the first imitation force values F22 of the second sensors at one side of the crease position relative to the positive direction of the second direction (i.e., the second imitation force values of the second sensors at five positions of 5, 10, 19, 18, 16 are summed to obtain the second value ΣF22); and if magnitude of the ΣF21 is less than magnitude of the ΣF22, determining that the second reference direction is the positive direction of the second direction (i.e., the projection of the moving direction of the display object in the second direction is defined as the second reference direction), as shown in FIG. 4 and FIG. 5.

S4012: calculating the first angle α according to the first resistance change values and the second resistance change values of the sensors located at the crease position.

The first angle is acquired according to the first reference direction and the second reference direction acquired in the step S4011 and the crease position acquired in the step S301. The step S4012 mainly includes:

calculating and summing the first imitation force values F111 of the first sensors in the first sensor layer at the crease position (i.e., the first imitation force values of the first sensors at five positions of 4, 9, 17, 15, 13 are summed to obtain ΣF111); and calculating and summing the second imitation force values F211 of the second sensors in the second sensor layer at the crease position (i.e., the second imitation force values of the second sensors at the five positions of 4, 9, 17, 15, 13 are summed to obtain ΣF211). As shown in FIG. 4 and FIG. 5, the tangent or the cotangent of the first angle is equal to a ratio of the ΣF111 to the ΣF211. As shown in FIG. 4, when the first reference direction is the positive direction of the first direction, the tangent of the first angle is equal to the ratio of the ΣF111 to the ΣF211, and when the first reference direction is the negative direction of the second direction, the cotangent of the first angle is equal to the ratio of the ΣF111 to the ΣF211.

To the step S4012, the acquisition of the moving direction in the control information of the display object is completed. I.e., when the upper left corner of the flexible display panel is in the bent state due to the bending force, the moving direction of the display object is moved to a lower right corner and deviated from the first direction by an angle α. Then the motion information of the display object is controlled by the display object in the flexible display panel according to the moving direction. For example, when a golf hole entering game is displayed in the flexible display panel, i.e., the user is playing a golf game, and the golf ball may be moved from a position to enter the hole by bending the flexible display panel. When the user bends the flexible display panel in the upper left corner of the flexible display panel, the golf ball at a certain position on the display page moves to the lower right corner. By repeatedly bending different positions of the flexible display panel, the moving direction of the golf ball is controlled until the golf ball enters the hole.

The above embodiments only the preferred embodiments of the present disclosure, and are not intended to limit the present disclosure. Any modification, equivalent replacement, etc. made within the spirit and principles of the present disclosure should be included in the scope of protection of the present application.

What is claimed is:

1. A display terminal, comprising:
a flexible display panel;
a sensor layer comprising a plurality of sensors which are flexible and distributed in an array, the sensor layer being used for converting a bending force experienced by the flexible display panel into changes in resistance value;
an arithmetic logic unit for acquiring resistance change values of the sensors distributed in the array in the flexible display panel in a bent state, acquiring a crease position of the flexible display panel according to the resistance change values of the sensors; and acquiring control information of a dynamic display object of the flexible display panel according to resistance change values of sensors located at the crease position and on both sides of the crease position; and
a display controller for receiving control signals of the arithmetic logic unit and controlling a dynamic display of the dynamic display object in the flexible display panel by the control signals,
wherein the controlling a dynamic display of the dynamic display object in the flexible display panel by the control signals comprises controlling, by the display controller, a moving direction of the dynamic display object by the control signals,
wherein the control information is used for generating the dynamic effect of the dynamic display object in the flexible display panel, and the dynamic display object is in a real scene image,
wherein the control information comprises the moving direction of the dynamic display object, a direction of the array comprises a first direction and a second direction perpendicular to each other, and a projection of a moving direction in the first direction is defined as a first reference direction, a projection of a moving direction in the second direction is defined as a second reference direction, and an angle between the moving direction and the first reference direction is defined as a first angle,
wherein the acquiring control information of the dynamic display object of the flexible display panel according to resistance change values of sensors located at the crease position and on both sides of the crease position comprises:
acquiring, by the arithmetic logic unit, the crease position;
acquiring, by the arithmetic logic unit, the first reference direction and the second reference direction according to first resistance change values and second resistance change values of sensors located on both sides of the crease position; and
calculating, by the arithmetic logic unit, the first angle by calculating a tangent or a cotangent of the first angle according to the first resistance change values and the second resistance change values of the sensors located at the crease position.

2. The display terminal according to claim 1, wherein the sensors distributed in an array comprises a plurality of first sensors and a plurality of second sensors, and the sensor layer comprises:
a first sensor layer comprising the first sensors distributed in an array for converting the bending force experienced by the flexible display panel into the changes in resistance value in a first direction; and
a second sensor layer comprising the second sensors distributed in an array for converting the bending force experienced by the flexible display panel into the changes in resistance value in a second direction.

3. The display terminal according to claim 2, wherein an area occupied by the sensors distributed in an array is greater than that of the flexible display panel on a display surface, the first sensors in the first sensor layer and the second sensors in the second sensor layer are distributed in the same way, and a first sensor is superimposed over a second sensor corresponding to the first sensor.

4. The display terminal according to claim 1, wherein the acquiring resistance change values of the sensors distributed in an array in the flexible display panel in a bent state comprises:
acquiring, by the arithmetic logic unit, the first resistance change values the sensors in the first direction; and
acquiring, by the arithmetic logic unit, the second resistance change values of the sensors in the second direction.

5. The display terminal according to claim 4, wherein the acquiring a crease position of the flexible display panel according to the resistance change values of the sensors comprises:
calculating, by the arithmetic logic unit, first imitation force values of the sensors according to the first resistance change values of the sensors, wherein the first imitation force values being equal to the first resistance change values multiplied by first conversion coefficients of the sensors; and calculate second imitation force values of the sensors according to the second resistance change values of the sensors, the second imitation force values being equal to the second resistance change values multiplied by second conversion coefficients of the sensors;
acquiring, by the arithmetic logic unit, a main direction of the bending force experienced by the flexible display panel according to the first imitation force values and the second imitation force values of the sensors; and acquiring the crease position according to the main direction of the bending force, the first imitation force values and the second imitation force values of the Sensors.

6. The display terminal according to claim 5, wherein the acquiring a crease position of the flexible display panel according to the resistance change values of the sensors further comprises: summing, by the arithmetic logic unit, the first imitation force values of the sensors to obtain a sum of the first imitation force values; and summing, by the arithmetic logic unit, the second imitation force values of the sensors to obtain a sum of the second imitation force values.

7. The display terminal according to claim 6, wherein the acquiring a crease position of the flexible display panel according to the resistance change values of the sensors further comprises:
acquiring, by the arithmetic logic unit, the sum of the first imitation force values and the sum of the second imitation force values;
determining, by the arithmetic logic unit, that the main direction of the bending force is in the first direction, when the sum of the first imitation force values is greater than the sum of the second imitation force values; determine that the main direction of the bending force is in the second direction, when the sum of the first imitation force values is less than the sum of the second imitation force values; and determining, by the arithmetic logic unit, one sensor with a largest second imitation force value in each column of the array in the second direction as a positioning sensor, so as to acquire a plurality of positioning sensors, and determining positions on which the positioning sensors are located as the crease position.

8. The display terminal according to claim 7, wherein the acquiring control information of the dynamic display object of the flexible display panel comprises:
   calculating, by the arithmetic logic unit, a sum of the first imitation force values of the sensors located at one side of the crease position relative to a negative direction of the first direction to obtain a first value;
   calculating, by the arithmetic logic unit, a sum of the first imitation force values of the sensors located at one side of the crease position relative to a positive direction of the first direction to obtain a third value;
   calculating, by the arithmetic logic unit, a sum of the second imitation force values of the sensors located at one side of the crease position relative to a negative direction of the second direction to obtain a second value; and
   calculating, by the arithmetic logic a sum of the second imitation force values of the sensors located at one side of the crease position relative to a positive direction of the second direction to obtain a fourth value;
   the first imitation force values are equal to the first resistance change values multiplied by the first conversion coefficients of the sensors; and the second imitation force values are equal to the second resistance change values multiplied by the second conversion coefficients of the sensors;
   acquiring, by the arithmetic logic unit, the first reference direction according to the first value and the third value, and acquire the second reference direction according to the second value and the fourth value;
   determining, by the arithmetic logic unit, that the first reference direction is the positive direction of the first direction, when the first value is less than the third value, and determine that the first reference direction is the negative direction of the first direction, when the first value is more than the third value;
   determining, by the arithmetic logic unit, that the second reference direction is the negative direction of the second direction, when the second value is greater than the fourth value, and determine that the second reference direction is the positive direction of the second direction, when the second value is less than the fourth value,
   calculating, by the arithmetic logic unit, a ratio of the sum of the first imitation force values and the sum of the second imitation force values according to the sum of the first imitation force values and the sum of the second imitation force values of the sensors located at the crease position; and
   calculating, by the arithmetic logic unit, a tangent or a cotangent of the first angle according to the ratio of the sum of the first imitation force values and the sum of the second imitation force values;
   the first imitation force values are equal to the first resistance change values multiplied by the first conversion coefficients of the sensors; and the second imitation force values are equal to the second resistance change values multiplied by the second conversion coefficients of the sensors,
   Wherein the first direction is parallel to a row of the array, the second direction is parallel to a column of the array, the positive direction of the first direction and the negative direction of the first direction are in opposite, and the positive direction of the second direction and the negative direction of the second direction are in opposite.

9. The display terminal according to claim 1, wherein the sensor layer comprises a plurality of first sensors and a plurality of second sensors distributed in an array in a same layer, and the first sensors for sensing resistance change value generated in the first direction and the second sensors for sensing resistance change value generated in the second direction are spaced apart.

10. The display terminal according to claim 1, wherein the control information further comprises a moving distance of the dynamic display object, and the arithmetic logic unit is further used for:
    acquiring, by the arithmetic logic unit, a bending rate of the flexible display panel during bending according to the crease position, and
    acquiring, by the arithmetic logic unit, a moving distance of the dynamic display object according to the bending rate.

11. A display control method, performed by a display terminal, wherein the display control method comprises:
    acquiring, by an arithmetic logic unit in the display terminal, resistance change values of the sensors distributed in an array in a flexible display panel in the display terminal in a bent state;
    acquiring, by the arithmetic logic unit, a crease position of the flexible display panel according to the resistance change values of the sensors;
    acquiring, by the arithmetic logic unit, control information of a dynamic display object of the flexible display panel according to the resistance change values of the sensors located at the crease position and on both sides of the crease position, and
    controlling, by a display controller in the display terminal, a dynamic display of the dynamic display object in the flexible display panel by control signals, wherein the controlling, by the display controller in the display terminal, a dynamic display of a dynamic display object in the flexible display panel by control signals comprises controlling, by the display controller, a moving direction of the dynamic display object by the control signals,
    wherein the control information comprises the moving direction of the dynamic display object, a direction of the array comprises a first direction and a second direction perpendicular to each other; and a projection of a moving direction in the first direction is defined as a first reference direction, a projection of a moving direction in the second direction is defined as a second reference direction, and an angle between the moving direction and the first reference direction is defined as a first angle,
    wherein the acquiring, by the arithmetic logic unit, control information of the dynamic display object of the flexible display panel according to resistance change values of sensors located at the crease position and on both sides of the crease position, comprises:
    acquiring, by the arithmetic logic unit, the crease position;
    acquiring, by the arithmetic logic unit, the first reference direction and the second reference direction according to first resistance change values and second resistance change values of sensors located on both sides of the crease position; and calculating, by the arithmetic logic unit, the first angle by calculating a tangent or, a cotangent of the first angle according to the first resistance change values and the second resistance change values of the sensors located at the crease position.

12. The display control method according to claim 11, wherein the acquiring, by an arithmetic logic unit in the display terminal, resistance change values of sensors distributed in an array in a flexible display panel in the display terminal in a bent state comprises:
    acquiring, by the arithmetic logic unit, first resistance change values of the sensors in the first direction; and
    acquiring, by the arithmetic logic unit, second resistance change values of the sensors in the second direction.

13. The display control method according to claim 12, wherein the acquiring, by the arithmetic logic unit, a crease position of the flexible display panel according to the resistance change values of the sensors comprises:
    calculating, by the arithmetic logic unit, first imitation force values of the sensors according to the first resistance change values of the sensors, wherein the first imitation force values being equal to the first resistance change values multiplied by first conversion coefficients of the sensors;
    calculating, by the arithmetic logic unit, second imitation force values of the sensors according to the second resistance change values of the sensors, wherein the second imitation force values being equal to the second resistance change values multiplied by second conversion coefficients of the sensors;
    acquiring, by the arithmetic logic unit, a main direction of a bending force on the flexible display panel according to the first imitation force values and the second imitation force values of the sensors; and
    acquiring, by the arithmetic logic unit, the crease position according to the main direction of the bending force, the first imitation force values and the second imitation force values of the sensors.

14. The display control method according to claim 13, wherein the acquiring, by the arithmetic logic unit, a main direction of a bending force on the flexible display panel according to the first imitation force values and the second imitation force values of the sensors comprises:
    summing, by the arithmetic logic unit, the first imitation force: values of the sensors to obtain a sum of the first imitation force values;
    summing, by the arithmetic logic unit, the second imitation forces values of the sensors to obtaining a sum of the second imitation force values; and
    judging, by the arithmetic logic unit, that the main direction of the bending force is in the first direction, when the sum of the first imitation force values is greater than the sum of the second imitation force values; and judging that the main direction of the bending force is in the second direction, when the sum of the first imitation force values is less than the sum of the second imitation force values.

15. The display control method according to claim 14, wherein when the main direction of the bending force is in the first direction, the acquiring, by the arithmetic logic unit, the crease position according to the main direction of the bending three, the first imitation force values and the second imitation force values of the sensors comprises:
    determining, by the arithmetic logic unit, one sensor with a largest second imitation force value in each column of the array in the second direction as a positioning sensor so as to acquire a plurality of positioning sensors, and determining positions on which the positioning sensors are located as the crease position.

16. The display control method according to claim 15, wherein the acquiring, by the arithmetic logic unit, the first reference direction and the second reference direction according to first resistance change values and second resistance change values of sensors located on both sides of the crease position comprises:
    calculating, by the arithmetic logic unit, a sum of the first imitation force values of the sensors located at one side of the crease position relative to a negative direction of the first direction to obtain a first value;
    calculating, by the arithmetic logic unit, a sum of the first imitation force values of the sensors located at one side of the crease position relative to a positive direction of the first direction to obtain a third value;
    calculating, by the arithmetic logic unit, a sum of the second imitation force values of the sensors located at one side of the crease position relative to a negative direction of the second direction to obtain a second value;
    calculating, by the arithmetic logic unit, a sum of the second imitation force values of the sensors located at one side of the crease position relative to a positive direction of the second direction to obtain a fourth value, the first imitation force values being equal to the first resistance change values multiplied by the first conversion coefficients of the sensors, and the second imitation force values being equal to the second resistance change values multiplied by the second conversion coefficients of the sensors;
    determining, by the arithmetic logic unit, that the first reference direction is the positive direction of the first direction, when the first value is less than the third value, and determining that the first reference direction is the negative direction of the first direction, when the first value is more than the third value; and
    determining, by the arithmetic logic unit, that the second reference direction is the negative direction of the second direction, when the second value is greater than the fourth value; and determining that the second reference direction is the positive direction of the second direction, when the second value is less than the fourth value,
    wherein the positive direction of the first direction and the negative direction of the first direction are in opposite, and the positive direction of the second direction and the negative direction of the second direction are in opposite.

17. The display control method according to claim 15, wherein a tangent or a cotangent of the first angle is equal to a ratio of the stun of the first imitation force values and the sum of the second imitation force values of the sensors located at the crease position; and
    the first imitation force values are equal to the first resistance change values multiplied by the first conversion coefficients of the sensors; and the second imitation force values are equal to the second resistance change values multiplied by the second conversion coefficients of the sensors.

* * * * *